United States Patent
Baughman et al.

(10) Patent No.: US 10,748,518 B2
(45) Date of Patent: Aug. 18, 2020

(54) ADAPTIVE SOUND MASKING USING COGNITIVE LEARNING

(71) Applicant: International Business Machines Corporation, Armonk, NY (US)

(72) Inventors: Aaron K. Baughman, Silver Spring, MD (US); Diwesh Pandey, Bangalore (IN); John P. Perrino, Hedgesville, WV (US); Todd R. Whitman, Bethany, CT (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 15/641,622

(22) Filed: Jul. 5, 2017

(65) Prior Publication Data
US 2019/0013003 A1 Jan. 10, 2019

(51) Int. Cl.
*G10K 11/16* (2006.01)
*G10K 11/175* (2006.01)
(Continued)

(52) U.S. Cl.
CPC ............ *G10K 11/175* (2013.01); *G06F 3/017* (2013.01); *H04R 1/1083* (2013.01); *H04R 1/403* (2013.01); *H04R 3/00* (2013.01); *H04R 29/001* (2013.01); *G06K 9/0061* (2013.01); *G06K 9/00302* (2013.01); *G06K 9/00389* (2013.01); *H04R 27/00* (2013.01); *H04R 2227/009* (2013.01)

(58) Field of Classification Search
CPC ........ H04R 1/1083; H04R 27/00; H04R 1/32; A61M 2230/005; A61M 2230/06; A61M 2230/50; G10K 11/175; G10K 11/16; G10K 11/178; H04K 1/02

USPC ................... 381/71.1, 71.4, 71.11, 104, 107
See application file for complete search history.

(56) References Cited

U.S. PATENT DOCUMENTS 6,778,672 B2    8/2004   Breed et al.
8,068,616 B2   11/2011   Copley et al.
(Continued)

OTHER PUBLICATIONS

Abdollahpouri et al., "A New Method for Active Noise Cancellation in the Presence of Three Unknown Moving Sources", Second Asia International Conference on Modelling & Simulation, 978-0-7695-3136-6/08 © 2008 IEEE DOI 10.1109/AMS.2008.61, pp. 1006-1011.

(Continued)

*Primary Examiner* — George C Monikang
(74) *Attorney, Agent, or Firm* — Monchai Chuaychoo (57) ABSTRACT

In an approach to adaptive sound masking, one or more computer processors analyze a surrounding of one or more users and stores in a database. The one or more computer processors receive a request from the one or more users for adaptive sound masking. The one or more computer processors analyzes a surrounding environment associated with the one or more users and storing a first information associated with the surrounding environment in a database. The one or more computer processors generate a cognitive sound mask base on the first information. The one or more computer processors produce a sound cone based on the cognitive sound mask and directing the sound cone at a distracting sound. The one or more computer processors adapt the sound cone based on changes to the surrounding environment.

20 Claims, 6 Drawing Sheets

(51) Int. Cl.
  *H04R 29/00* (2006.01)
  *H04R 1/40* (2006.01)
  *H04R 3/00* (2006.01)
  *G06F 3/01* (2006.01)
  *H04R 1/10* (2006.01)
  *G06K 9/00* (2006.01)
  *H04R 27/00* (2006.01)

(56) References Cited

U.S. PATENT DOCUMENTS

| | | | |
|---|---|---|---|
| 8,184,824 B2 | 5/2012 | Hettinger et al. | |
| 8,189,799 B2 | 5/2012 | Shridhar et al. | |
| 9,020,158 B2 | 4/2015 | Wertz et al. | |
| 9,369,801 B2 | 6/2016 | Carlsson et al. | |
| 2008/0064413 A1 | 3/2008 | Breed | |
| 2008/0304677 A1* | 12/2008 | Abolfathi | G10K 11/178 381/71.1 |
| 2011/0044467 A1 | 2/2011 | Pompei | |
| 2011/0188666 A1* | 8/2011 | Mason | G10K 11/175 381/73.1 |
| 2013/0142337 A1 | 6/2013 | Troughton et al. | |
| 2014/0119564 A1* | 5/2014 | Caskey | G05B 1/01 381/86 |
| 2016/0093282 A1 | 3/2016 | Moshksar | |
| 2016/0165336 A1 | 6/2016 | Di Censo et al. | |
| 2016/0353218 A1* | 12/2016 | Starobin | G06F 3/167 |

OTHER PUBLICATIONS

Komatsu et al., "Extracting Users' Intended Nuances from Their Expressed Movements: In Quadruple Movements", AH '15, Mar. 9-11, 2015, Singapore, Singapore Copyright 2015 ACM 978-1-4503-3349-8/15/03 <http://dx.doi.org/10.1145/2735711.2735799>, pp. 175-176.

Lim et al., "Multi-domain active sound control and noise shielding", J_ID: JAS DOI: 10.1121/1.3531933, J. Acoust. Soc. Am. 129 (2), Feb. 2011, © 2011 Acoustical Society of America, 10 pages.

Nagae et al., "Hearing Impairment Simulator Based on Compressive Gammachirp Filter", APSIPA, 2014978-616-361-823-8 © 2014 APSIPA, printed Mar. 8, 2017, 4 pages.

Rogers, Steven, C., "Active Flexible Noise Cancellation", American Institute of Aeronautics and Astronautics, AIAA-2009-2068, © 2009, AIAA Infotech@Aerospace Conference Conference Apr. 6-9, 2009, Seattle, Washington, 15 pages.

"Directional Sound", from Wikipedia, the free encyclopedia, <https://en.wikipedia.org/wiki/Directional_sound>, printed Mar. 8, 2017, 2 pages.

Baughman et al., "Adaptive Sound Masking Using Cognitive Learning", U.S. Appl. No. 15/815,747, filed Nov. 17, 2017, 31 pages.

IBM, Appendix P, list of patents or patent applications treated as related, filed herewith, 2 pages.

* cited by examiner

ADAPTIVE SOUND MASKING USING COGNITIVE LEARNING

BACKGROUND OF THE INVENTION

The present invention relates generally to the field of sound masking and more particularly to adaptive sound mask generation.

Humans have been masking their movement for thousands of years. During prehistoric times, humans quietly stalk their prey without making a sound. Stealth is the key to survival since it meant having a meal that night or the whole tribe going hungry. Modern day humans are fortunate that they do not need to forage for food or need to mask their footsteps. However, sound or noise does play an important role in today's modern society. For example, a group of students trying to study for the law school exams in the library can be distracted by the noise generated by the sound of the janitorial staff vacuuming the carpet 10 feet away. Considering another example, the sound of a tennis player hitting the ball can be masked so that an opponent is slow to react to the serve.

SUMMARY

Embodiments of the present invention disclose a method, a computer program product, and a system for adaptive sound masking. The method may include one or more computer processors analyzing a surrounding of one or more users and storing in a database. The one or more computer processors receive a request from the one or more users for sound masking. The one or more computer processors analyzes a surrounding environment associated with the one or more users and storing a first information associated with the surrounding environment in a database. The one or more computer processors generate a cognitive sound mask base on the first information. The one or more computer processors produce a sound cone based on the cognitive sound mask and directing the sound cone at a distracting sound. The one or more computer processors adapt the sound cone based on changes to the surrounding environment.

DETAILED DESCRIPTION

Embodiments of the present invention recognize that improvements to sound masking can be made by using adaptive sound masking technique. These improvements lie in the embodiment's ability to create a sound mask that can learn over time to adapt and optimize for various users. As a result, the behavior and cognitive state of the users are altered so that users can continue to function without sound distractions or distracting sounds. Implementation of embodiments of the invention can take a variety of forms, and exemplary implementation details are discussed subsequently with reference to the Figures.

Figure 1:
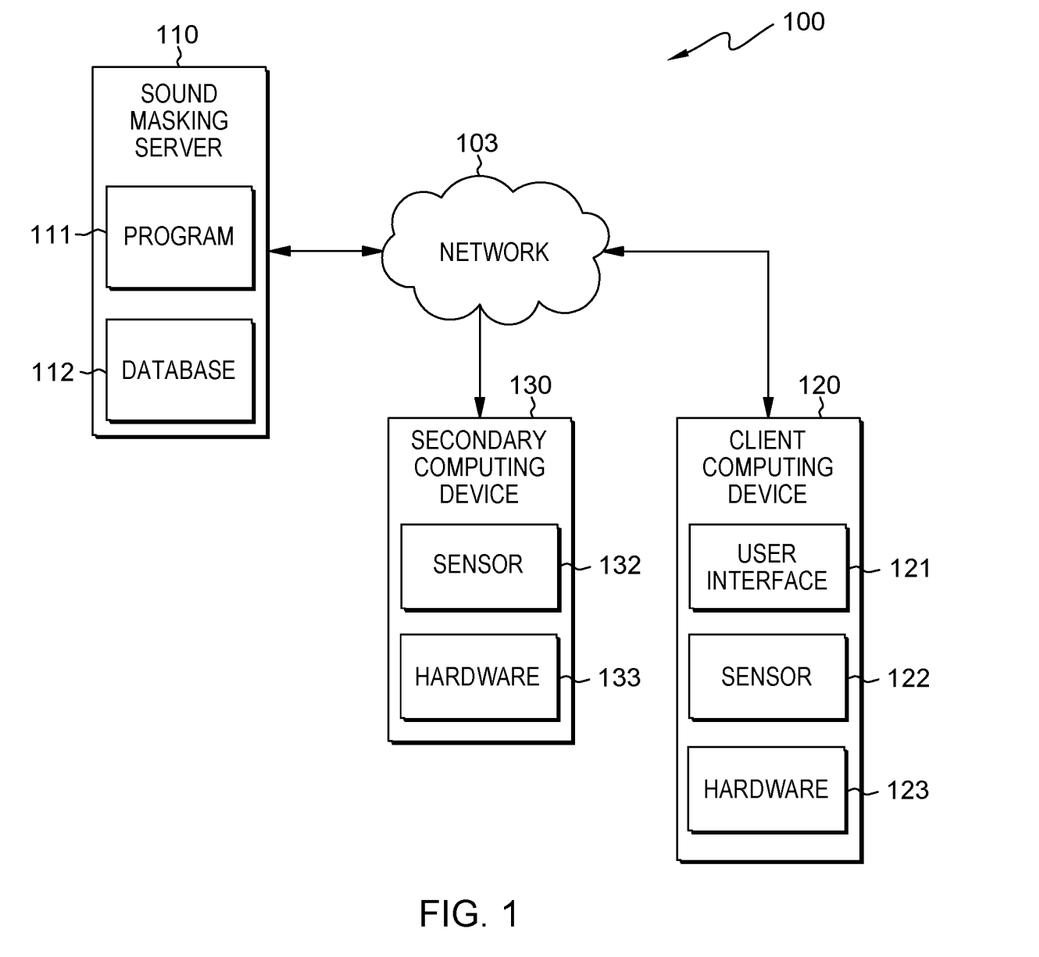
FIG. 1 is a functional block diagram illustrating an adaptive sound masking data processing environment, in accordance with an embodiment of the present invention.

FIG. 1 is a functional block diagram illustrating an adaptive sound masking data processing environment, generally designated 100, in accordance with one embodiment of the present invention. FIG. 1 provides only an illustration of one implementation and does not imply any limitations with regard to the environments in which different embodiments can be implemented. Those skilled in the art can make modifications to the depicted environment without departing from the scope of the invention as recited by the claims.

Adaptive sound masking data processing environment 100 includes sound masking server 110, client computing device 120 and secondary computing device 130, all interconnected over network 103. Network 103 can be, for example, a telecommunications network, a local area network (LAN), a wide area network (WAN), such as the Internet, or a combination of the three, and can include wired, wireless, or fiber optic connections. Network 103 can include one or more wired and/or wireless networks that are capable of receiving and transmitting data, voice, and/or video signals, including multimedia signals that include voice, data, and video information. In general, network 103 can be any combination of connections and protocols that will support communications between sound masking server 110, client computing device 120 and other computing devices 130 within adaptive sound masking data processing environment 100.

Sound masking server 110 can be a standalone computing device, a management server, a web server, a mobile computing device, or any other electronic device or computing system capable of receiving, sending, and processing data. In other embodiments, sound masking server 110 can represent a server computing system utilizing multiple computers as a server system, such as in a cloud computing environment. In another embodiment, sound masking server 110 can be a laptop computer, a tablet computer, a netbook computer, a personal computer (PC), a desktop computer, a personal digital assistant (PDA), a smart phone, or any other programmable electronic device capable of communicating with client computing device 120, and other computing devices (not shown) within adaptive sound masking data processing environment 100 via network 103. In another embodiment, sound masking server 110 represents a computing system utilizing clustered computers and components (e.g., database server computers, application server computers, etc.) that act as a single pool of seamless resources when accessed within adaptive sound masking data processing environment 100. Sound masking server 110 includes sound masking component 111 and database 112.

Sound masking component 111 enables an improved user experience based on reducing the sound distraction. Sound masking component 111 uses an adaptive or cognitive learning technique to determine the habit of the users and frequent interaction between the users in the environment. For example, the habit of the users being scrutinized can include, but is not limited to, a musical preference as the user is performing a certain task, a preferred room for the user to study for a test and a background noise tolerance level of the user while the user is performing a task. In addition, after analyzing the habit of the user and background environment, sound masking component 111 is able to predict or forecast and generate the optimal sound waves to reduce the noise distraction for the user. Sound masking component 111 is depicted and described in further detail with respect to FIG. 2.

Database 112 is a repository for data used by sound masking component 111. In the depicted embodiment, database 112 resides on sound masking server 110. In another embodiment, database 112 can reside elsewhere within adaptive sound masking data processing environment 100, provided that sound masking component 111 has access to database 112. A database can be an organized collection of data. Database 112 can be implemented with any type of storage device capable of storing data and configuration files that can be accessed and utilized by sound masking server 110, such as, but not limited to, a database server, a hard disk drive, or a flash memory. Database 112 uses one or more of a plurality of techniques known in the art to store a plurality of information of a user, such as a preference, a routine, etc. For example, database 112 can store information about a noise profile, an individual user profile and a group profile.

Client computing device 120 and secondary computing device 130 can be a laptop computer, a tablet computer, a smart phone, or any programmable electronic mobile device capable of communicating with various components and devices within adaptive sound masking data processing environment 100, via network 103. Client computing device 120 and secondary computing device 130 can be a wearable computer. Wearable computers are miniature electronic devices that may be worn by the bearer under, with, or on top of clothing, as well as in or connected to glasses, hats, or other accessories. In general, client computing device 120 and secondary computing device 130 represents any programmable electronic device or combination of programmable electronic devices capable of executing machine readable program instructions and communicating with other computing devices (not shown) within adaptive sound masking data processing environment 100 via a network, such as network 103. Client computing device 120 includes user interface 121, sensor 122, and hardware 123. Secondary computing device 130 includes sensor 132 and hardware 133.

User interface 121 provides an interface to sound masking component 111 on sound masking server 110 for a user of client computing device 120. In the depicted embodiment, user interface 121 resides on client computing device 120. In another embodiment, user interface 121 can reside on a secondary computing device (not shown) within adaptive sound masking data processing environment 100. In one embodiment, user interface 121 can be a graphical user interface (GUI) or a web user interface (WUI) and can display text, documents, web browser windows, user options, application interfaces, and instructions for operation. Further, user interface 121 displays the information (such as graphic, text, and sound) that a program presents to a user and the control sequences the user employs to control the program. In another embodiment, user interface 121 can also be mobile application software that provides an interface between client computing device 120 and sound masking server 110. Mobile application software, or an "app," is a computer program designed to run on smart phones, tablet computers, wearable computers and other mobile devices. User interface 121 enables a user to start the sound masking process. For example, if client computing device 120 is a smart phone, then the user can press a command button which sends a request to activate sound masking component 111.

Sensor 122 and sensor 131 represents one or more sensors, which enable tracking of a user of client computing device 120. A sensor is a device that detects and/or measures a physical property and then records and/or otherwise responds to that property. It should be noted that a physical property can include, but is not limited to, vibrations, chemicals, radio frequencies and environmental conditions such as, but not limited to, weather, humidity, light, etc. In an embodiment, sensor 122 or sensor 131 includes an optical sensor that enables, eye, facial, and head tracking of a user. In another embodiment, sensor 122 or sensor 132 can include a microphone that measures sound waves. In yet another embodiment, sensor 122 or sensor 132 can include devices that detect various frequencies of the electromagnetic radiation spectrum. For example, sensor 122 or sensor 132 can detect the presence of NFC tags or other NFC enabled devices.

Hardware 123 and hardware 132 provides a mechanism to generate a sound cone. Hardware 123 or hardware 132 can include, but is not limited to, an amplifier, a mixer, a masking generator, a spectrum equalizer, and a transducer. A transducer can be any device capable of receiving an electrical audio signal and converting the signal into a corresponding sound, via sound waves.

Figure 2:
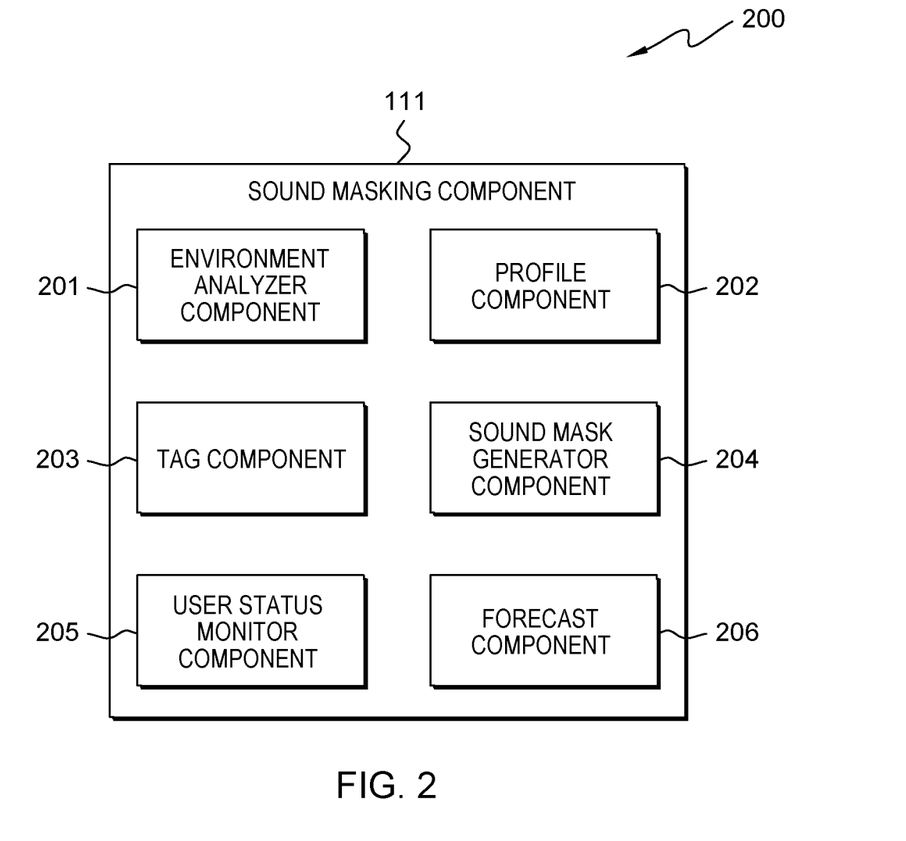
FIG. 2 is a functional block diagram illustrating sound masking component from FIG. 1, in accordance with an embodiment of the present invention.

FIG. 2 is a functional block diagram depicting sound masking component 111 comprising environment analyzer component 201, profile component 202, tag component 203, sound mask generator component 204, user status monitor component 205 and forecast component 206.

Environment analyzer component 201 of an embodiment of the present invention provides the capability to scan the user and the surrounding environment of the user. A user can be a human or a robot user. Scanning the user and surrounding environment consists of determining the current activity of the user. For example, environmental analyzer component 201 determines the one or more users are studying in a library via sensor 123. In another example, environmental analyzer component 201 determines the one or more users are playing in a doubles tennis match. After ascertaining the activity of the user, environmental analyzer component 201 scans for a target sound. The target sound is the sound generated either by the user or within the surrounding environment of the one or more users. Environmental analyzer component 201 analyzes and records the target sound and stores the data in database 112.

Profile component 202 of an embodiment of the present invention provides the capability for sound masking component 111 to store and retrieve a profile based on the current activity of the user. A profile can include but is not limited to, a user profile, a group profile, and a sound profile. A user profile is a sound preference setting that profile component 202 has determined based on observation of the behavior of the user. The user can be a human or a robot. The robot can include, but is not limited to, an autonomous robot with artificial intelligence, a tele-operated robot an industrial robot, a medical robot, an entertainment robot, a space robot, a military robot, a service robot, and a domestic robot. Profile component 202 can use a technique of predictive analytics, such as machine learning, as a method for determining the behavior. A behavior can include, but is not limited to, a habit, a pattern, a routine, a preference, a style, an interest in a topic, a level of interest in a topic, a knowledge level of a topic, a hobby, and a propensity. In an embodiment, profile component 202 determines the sound preference setting of the user via machine learning and stores the profile in database 112. For example, the user, consistently over a period of two months, prefers to listen to classical music while studying. In another example, profile component 202 determines the user is less distracted while writing a patent application if whale songs are playing in the background. In yet another example, profile component 202 determines the user is more satisfied while playing tennis if the sound of the tennis ball hitting the racket of the user is absent during a match.

A group profile is a sound preference setting for one or more users that profile component 202 has determined based on observation of the one or more users. In an embodiment, profile component 202 111 determines the sound preference setting of the one or more users via machine learning and stores the profile in database 112. For example, after observing the group of users for two weeks, profile component 202 determines the group of users prefers to listen to pop music as the group is collaborating on a school project. In another example, profile component 202 concludes the group of users is less distracted when playing chess if opera songs are playing in the background.

A sound profile is a background sound or target sound that can be naturally occurring or man-made. In addition, a sound profile is the target sound determined by environment analyzer 201. A target sound can include, but is not limited to, a sound made from thunderstorms, a sound from a vacuum cleaner and a sound of tennis ball hitting a racket.

Tag component 203 of an embodiment of the present invention provides the capability to create a cognitive sound mask. The cognitive sound mask is combination of profiles (sound, user or group) and is created by tagging or assigning the user with one or more profiles. For example, environment analyzer component 201 has determined from analyzing the surrounding environment that the user is studying in the library and there is a janitorial staff vacuuming the floor several meters away from the user. Sound masking component 111 determines that the user is less distracted while studying if listening to classical music based on learning the behavior of the user. Profile component 202 retrieves the sound profile of the vacuum cleaner and the user profile. Tag component 203 combines both profiles into a cognitive sound mask and tag the user with the cognitive sound mask. Tag component 203 can use several techniques known in the art such as active noise cancellation and sound masking to normalize the vacuum cleaner sound as part of the tagging process. After tagging the user, tag component 203 creates a cognitive sound mask profile and stores the cognitive sound mask profile in database 112.

Sound mask generator component 204 of an embodiment of the present invention provides the capability to produce the sound waves from the created cognitive sound mask profile. In an embodiment, sound mask generator component 204 retrieves the cognitive sound mask profile from database 112 and produces a sound wave portion of the cognitive sound mask profile. Sound mask generator 2 component 04 directs the sound wave as a sound cone towards the user via hardware 123. For example, tag component 203 determines that, for a user that is studying in the library with the sound of vacuum cleaner, the method of sound masking is producing a sound cone that contains the vacuum cleaning cancellation waveform and classical music waveform. The sound cone reproduction can be created by several methods known in the art including sound masking and active or passive noise cancellation techniques. In another embodiment, sound profile component 202 determines that the user is playing tennis and recalls the preference of the user to mask the tennis serve. For example, tag component 203 produces a sound cone with the sound profile of the tennis ball hitting a racket and directs the sound cone at the user. The sound cone is a cancellation waveform of the tennis ball hitting a racket. The opponent of the user cannot gauge the serve and is unable to return the ball with any success.

User status monitor component 205 of an embodiment of the present invention provides the ability to determine whether the user is distracted from the target sound based on the current activity. In an embodiment, where a user is a human, user status monitor component 205 ascertains the physical and emotional status of the user. For example, user status monitor 205 detects a facial expression of the user indicates frustration via sensor 123. Furthermore, user status monitor component 205 ascertains the cognitive state of the user. The cognitive state of the user is made up of at least two components, attention, and activity. The attention component is the emotional portion while activity is the physical component of the overall cognitive state of the user. User status monitor component 205 measures the physical component of the user while the user is engaged in an activity. For example, environment analyzer component 201 determines that the user is studying in the library. User status monitor component 205 determines the emotional component of the user while studying in the library, via sensor 122. User status monitor component 205 detects a frown expression on the face of the user, which usually indicates a frustration with the current activity. Furthermore, user status monitor component 205 detects a rise in heart rate of the user and determines that the rise in heart rate of the user corresponding with the frown expression typically indicates the user is stressed. User status monitor component 205, based on the emotional and physical measurement of the user, determines that the user is unable to focus on the current task of studying, i.e., is distracted.

In an embodiment, where a user is a robot, user status monitor component 205 ascertains the distraction level of the robot. Distraction level of a robot is not measured the same way as a human user. However, it can be inferred based on productivity or performance of a robot user. For example, there are two robots in a manufacturing environment. The first robot is assembling engine components. The second robot is a delivery robot that uses optical sensor and sonar to navigate the factory floor. The first robot performs the engine assembly task based on sound commands cues from the operator. However, second robot emits the same sound pattern that is used by the first robot as part of the sonar navigation program. User status monitor component 205 analyzes the performance of the first robot, measured by the number of engine assembled per hour, against the sound distraction by the second robot. The upper threshold limit, number of engines assembled per hour by the robot, is selectable by the operator. As the performance of the first robot degrades below the threshold level, user status monitor component 205 can determine whether the first robot is distracted by the second robot. In addition, user status monitor component 205 detects that the duration of the task performed by the first robot was longer than normally expected. Typically, the first robot completes the task in an hour of assembling an engine without any other robots in the vicinity. However, the first robot completes the same task in one and half hour when the second robot is in close proximity.

Forecast component 206 of an embodiment of the present invention provides the capability to predict the user distraction of an activity based on data gathered from analyzing the surroundings and based on learned behavior. In an embodiment, sound masking component 111 determines that a new factor exists that interferes with the activity of the user and creates a new cognitive sound mask. For example, a group of verbose students decides to sit next to the user who is studying in the library. Profile component 202 creates a new sound profile for the group of verbose students. Tag component 203 tags the sound profile with the user for the current activity and creates a new cognitive sound mask based on the result of forecasting.

Figure 3:
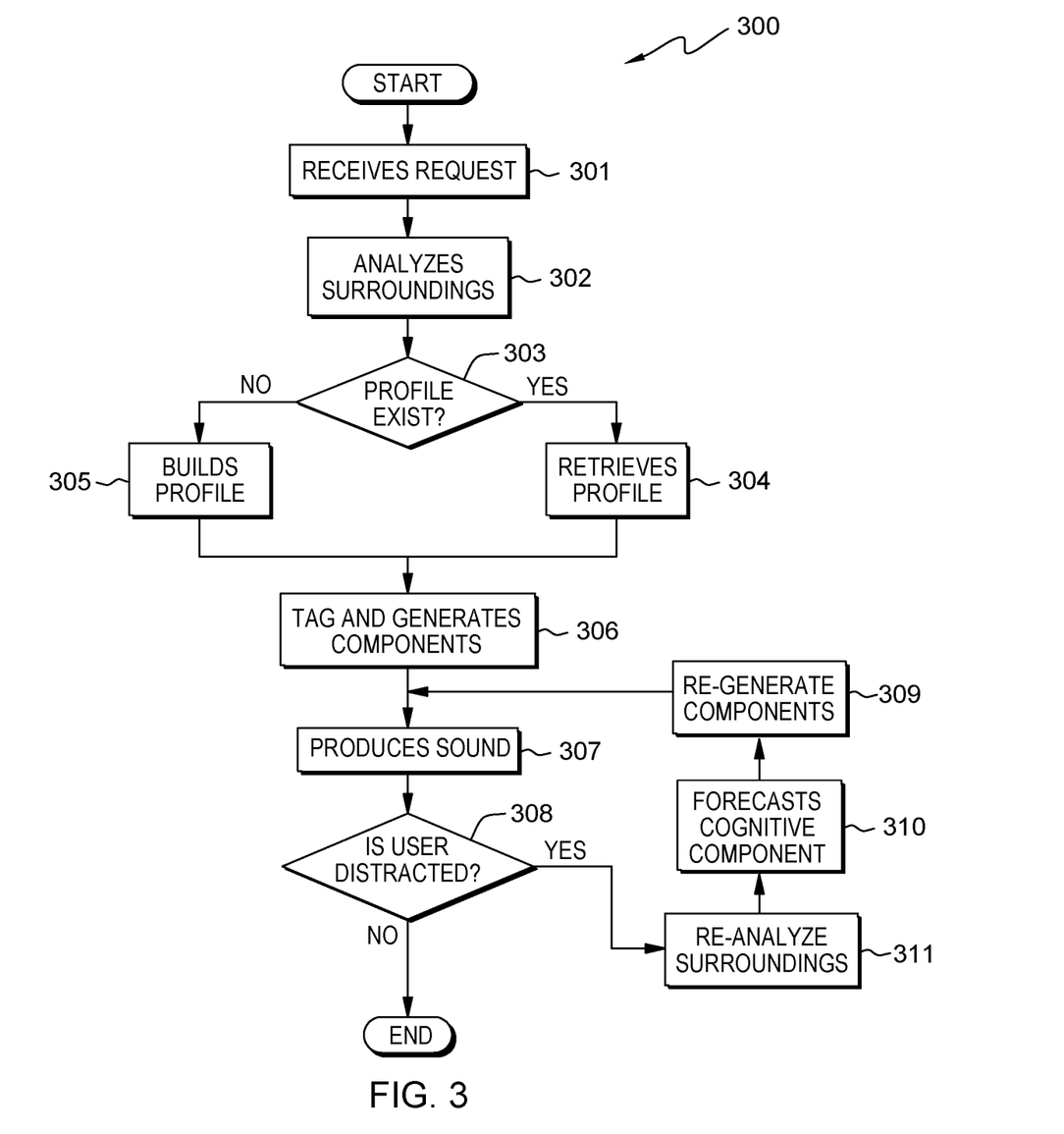
FIG. 3 is a flowchart depicting operational steps of a method for adaptive sound masking, in accordance with an embodiment of the present invention.

FIG. 3 is a flowchart depicting operational steps of sound masking component 111, on sound masking server 110 within adaptive sound masking data processing environment 100 of FIG. 1, in accordance with an embodiment of the present invention. The flowchart 200 comprises the steps receives request 301, analyzes surroundings 302, profile exist 303, retrieves profile 304, builds profile 305, tag and generates components 306, produces sound 307, is use distracted 308, re-analyze surroundings 309, forecast features 310 and regenerate components 311.

Sound masking component 111 receives a request from a user (step 301). In an embodiment, sound masking component 111 receives a request from client computing device 120. For example, the user can press a button via user interface 121 to send a request to sound masking component 111 to begin the sound masking process. In another embodiment, sound masking component 111 can automatically receive a request from the user via sensor 122. For example, where sensor 122 is an optical camera, sensor 122 recognizes the user via facial recognition software and transmits the identity of the user to sound masking component 111. Sound masking component 111 automatically begins the task of the sound masking process for the user.

Sound masking component 111 analyzes the surroundings of the user (step 302). In an embodiment, sound masking component 111 through environment analyzer component 201 uses sensor 122 to analyze the surrounding environment of the one or more users.

Sound masking component 111 determines the activity of the one or more users via sensor 122 and stores information about the activity in database 112. For example, where sensor 122 is an optical camera, sound masking component 111 determines the one or more users are studying in a library based on the data transmitted from sensor 122. Sound masking component 111 stores the information on the activity of the one or more users studying in the library in database 112.

Sound masking component 111 through user status monitor component 205 determines level of distraction expressed by the users while performing the current activity. In an embodiment, sound masking component 111 determines the emotional state of one or more users via sensor 122. For example, where sensor 122 is an optical camera, sensor 122 detects a facial expression of the user indicates frustration and transmits the information to sound masking component 111. Sound masking component 111 determines, based on receiving data from sensor 122, the user is frustrated with the current activity and stores information in database 112. In another example, where sensor 122 is an optical camera, sensor 122 detects a pupil size of the user as the user is reading a book and transmits the information to sound masking component 111. Sound masking component 111 determines, based on the pupil dilation, the user is interested in the subject matter of the book and stores information in database 112.

Sound masking component 111 determines whether a profile exists (step 303). After ascertaining the surrounding of the user via sensor 122, sound masking component 111 determines if a profile exists for the user based on the current activity of the user. The profile can include, but is not limited to, a user profile, a group profile, and a sound profile.

Sound masking component 111 through profile component 202 retrieves the profile (step 304). In order to provide a personalized experience for the user, sound masking component 111 verifies the existence of the profile. In an embodiment, sound masking component 111 determines whether the profile exists. After determining the profile exists in database 112, sound masking component 111 retrieves the profile.

Sound masking component 111 through profile component 202 builds the profile (step 305). In an embodiment, if the profile does not exist, then sound masking component 111 builds a profile based on machine learning. The profile can include, but is not limited to, a user profile, a group profile, and a sound profile. In another embodiment, the one or more users can create the profile manually by inputting preferences via client computing device 120 and save the profile in database 112. For example, a user can answer a questionnaire, via user interface 121, that ranks their tolerance level to various noises corresponding to an activity. In another example, a user can select a Likert-type scale (1-5) of what noise level they will tolerate while they are driving.

Sound masking component 111 through tag components 203 tags and generates the sound components (step 306). Sound masking component through tag components 203 combines the profiles and builds a cognitive sound mask profile. The cognitive sound mask profile is stored in database 112.

Sound masking component 111 through sound mask generator component 204 produces the sound (step 307). Sound masking component 111 retrieves the cognitive sound mask profile from database 112 that was previously created (step 306). In an embodiment, sound masking component 111 determines that the user is playing tennis and recalls the preference of the user to mask the tennis serve. For example, sound masking component 111 produces a sound cone with the sound profile of the tennis ball hitting a racket and directs the sound cone at the user. The sound cone is a cancellation waveform of the tennis ball hitting a racket. The opponent of the user cannot gauge the serve and is unable to return the ball with any success.

Sound masking component 111 through user status monitor component 205 determine whether user is distracted (decision block 308). If sound masking component 111 determines that the user is not distracted ("no" branch, decision block 308) then sound masking component 111 ends. If sound masking component 111 determines that the user is still distracted ("yes" branch, decision block 308) then sound masking component 111 proceeds to re-analyze the surrounding (step 309)

Sound masking component 111 re-analyzes the surroundings (step 309). After ascertaining that the user is distracted, sound masking component 111 re-analyzes the surrounding of the user to determine if there are other factors that may be causing the user to be distracted. In an embodiment, sound masking component 111 analyzes the surroundings of the user and saves the information in database 112. For example, sound masking component 111 determines there is another group of students talking loudly next to the user. This group was not present initially when the user first started studying. Sound masking component 111 begins to forecast subject features (step 310).

Sound masking component 111 through forecast component 206 forecasts features (step 310). Sound masking component 111 forecasts the features of the user. Forecasting features is a way to predict the user distraction of an activity based on data gathered from analyzing the surroundings and based on learned behavior. Sound masking component 111 creates a new cognitive sound mask based on the result of forecasting features. A cognitive sound mask is created by tagging the subject or user with one or more profile.

Sound masking component 111 re-generates sound components (step 311). In an embodiment, after retrieving the new cognitive sound mask from database 112, sound masking component 111 produces the sound wave portion of the cognitive sound mask and directs the sound wave as a cone towards the user via hardware 123. For example, for a user that is studying in the library next to a group of verbose students, sound masking component 111 produces a cancellation waveform of the noise generated by the group of students.

Sound masking component 111 directs that waveform into a cone and aims the cone at the user (step 307). In another embodiment, after retrieving the cognitive sound mask from database 112, sound masking component 111 produces the sound wave portion of the cognitive sound mask and directs the sound wave as a cone towards the target of the noise via hardware 123. For example, for a user that is studying in the library next to a group of verbose students, sound masking component 111 produces a cancellation waveform of the noise generated by the group of students. Sound masking component 111 then directs that waveform into a sound cone and aims at the group of verbose students. Furthermore, sound masking component 111 through user status monitor component 205 determines whether the user is still distracted (decision block 308) and continuously monitor and adjust the sound cone mask during the activity of the user. In another embodiment, the user can manually end the sound masking component 111 by user interface 120. For example, user presses "STOP" button on the client computing device 120 after the user has finished studying in the library and is leaving the building.

Figure 4:
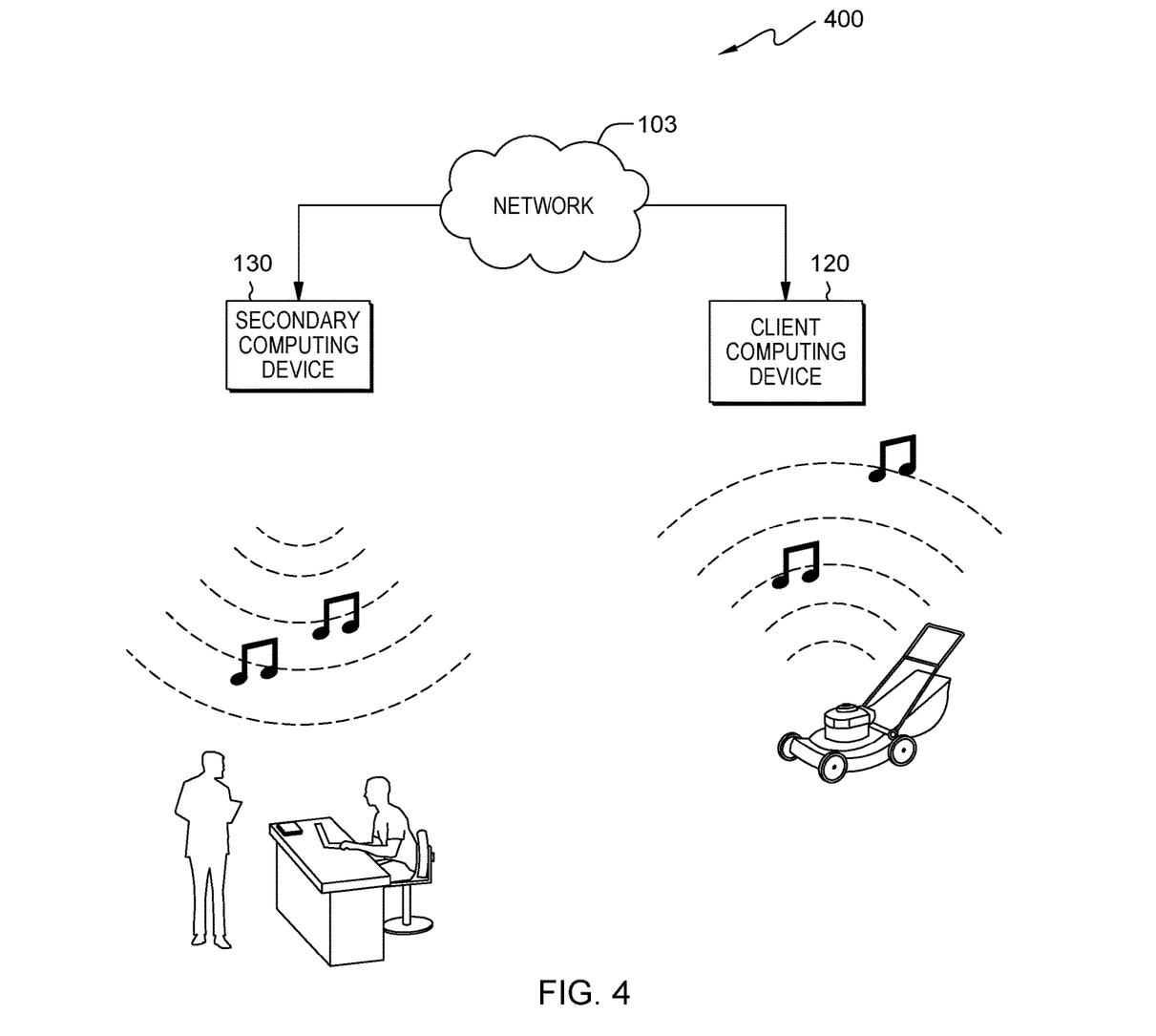
FIG. 4 illustrates a functionality of adaptive sound masking, in accordance with an embodiment of the present invention.

FIG. 4 illustrates an example of the functionality of a program, on a server computer within the adaptive sound masking data processing environment of FIG. 1, for dynamically adaptive sound masking, in accordance with an embodiment of the present invention. In this example, the target sound of lawnmower 402 is disturbing the human users 401. However, other combination can exists such as robots disturbing human users or vice versa. Sound masking component 111 detects the target sound from lawnmower 402 which is in near proximity to human users 401. Human users 401 are a group of engineers engaged in an activity of creating innovative products for a company. Sound masking component 111 creates a sound profile of lawnmower 402 along with group profile of human users 401. Sound masking component 111 combines the two profiles to create a cognitive sound mask. The cognitive sound mask is used to generate sound waveform and is directed towards the human users 401 in order to mask the sound of lawnmower 402. Hence, human users 401 can concentrate on their current activity.

Figure 5:
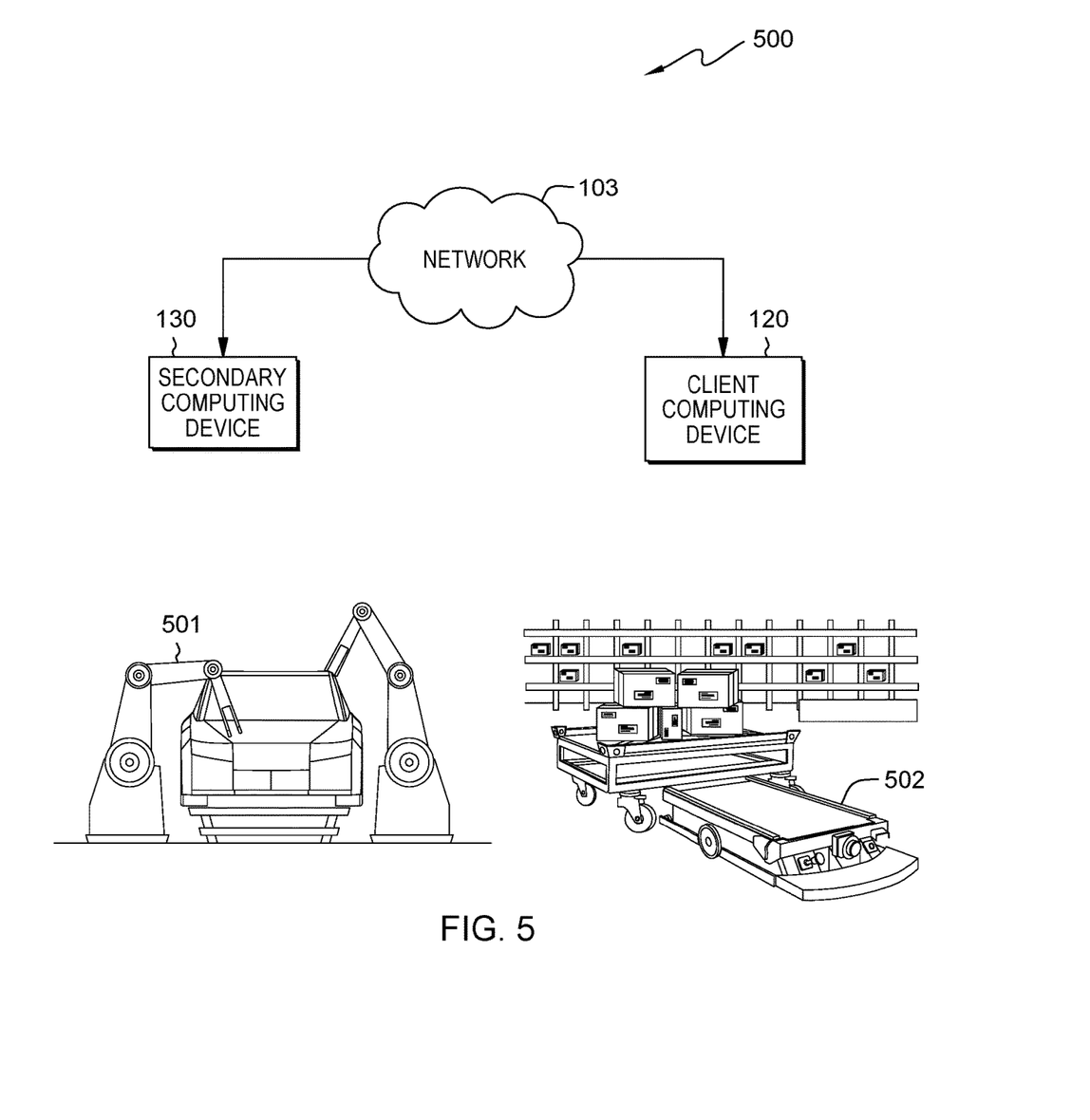
FIG. 5 illustrates another functionality of adaptive sound masking, in accordance with an embodiment of the present invention.

FIG. 5 illustrates the functionality of a program, on a server computer within the adaptive sound masking data processing environment of FIG. 1, for dynamically adaptive sound masking, in accordance with an embodiment of the present invention. In the current embodiment, there are two robots in a manufacturing environment. However, other combination can exists such as robots disturbing human users or vice versa in other embodiments. The first robot 501 is assembling engine components. The second robot 502 is a delivery robot that uses optical sensor and sonar to navigate the factory floor. The first robot 502 performs the engine assembly task based on sound commands cues from the operator. However, second robot 502 emits the same sound pattern that is used by first robot 501 as part of the sonar navigation program of second robot 502. Sound masking component 111 receives request from first robot 501 to begin the sound masking process after second robot 502 moves within the vicinity of first robot 501. Sound masking component 111 determines that activity of second robot 502 will interfere with the performance of first robot 501 based on the sound generated by second robot 502. Sound masking component 111 creates a profile for second robot 502 and tags the second robot 502 with the created sound profile. Sound masking component 111 combines the tagged sound profile with first robot 501 activity to create a cognitive sound mask. Sound masking component 111 produces the sound wave portion of the cognitive sound mask and directs the sound wave as a cone towards the robot 501 via secondary computing device 130. First robot 501 will be able to perform the task without any hindrance from second robot 502.

Figure 6:
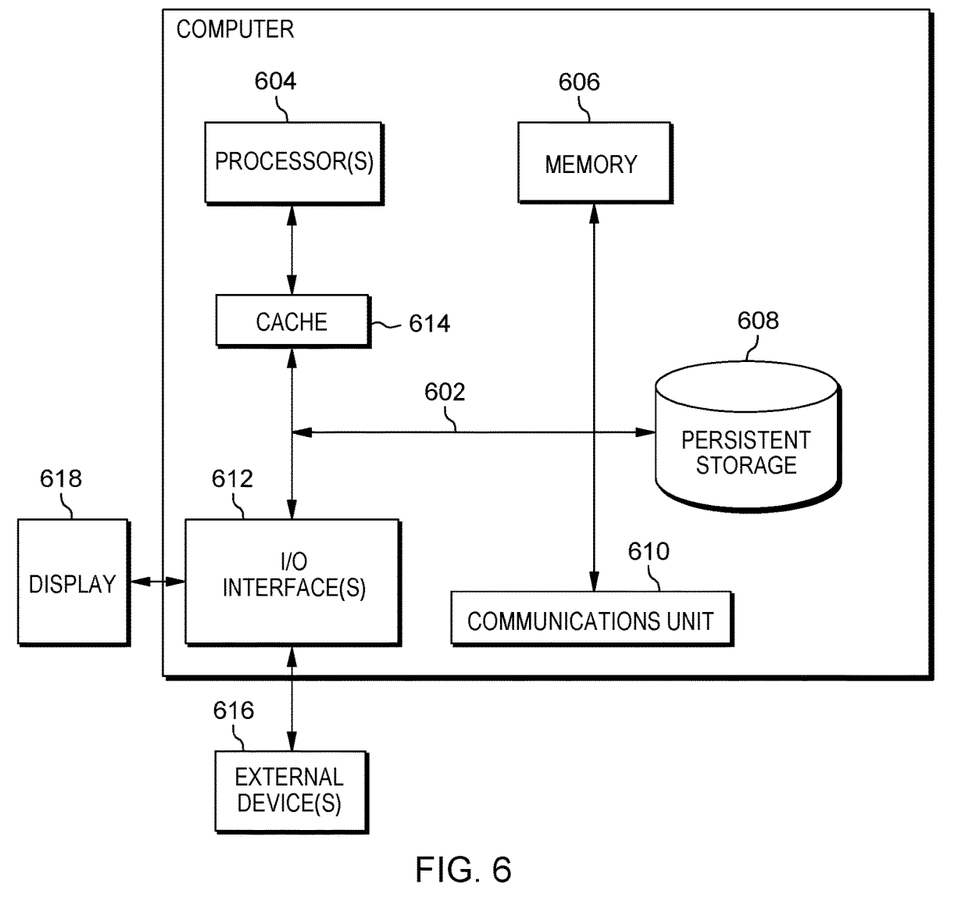
FIG. 6 depicts a block diagram of components of the server computer executing the program within the adaptive sound masking data processing environment of FIG. 1, in accordance with an embodiment of the present invention.

FIG. 6 depicts a block diagram of components of sound masking server 110 within adaptive sound masking data processing environment 100 of FIG. 1, in accordance with an embodiment of the present invention. It should be appreciated that FIG. 6 provides only an illustration of one implementation and does not imply any limitations with regard to the environments in which different embodiments can be implemented. Many modifications to the depicted environment can be made.

Sound masking server 110 can include processor(s) 604, cache 614, memory 606, persistent storage 608, communications unit 610, input/output (I/O) interface(s) 612 and communications fabric 602. Communications fabric 602 provides communications between cache 614, memory 606, persistent storage 608, communications unit 610, and input/output (I/O) interface(s) 612. Communications fabric 602 can be implemented with any architecture designed for passing data and/or control information between processors (such as microprocessors, communications and network processors, etc.), system memory, peripheral devices, and any other hardware components within a system. For example, communications fabric 602 can be implemented with one or more buses.

Memory 606 and persistent storage 608 are computer readable storage media. In this embodiment, memory 606 includes random access memory (RAM). In general, memory 606 can include any suitable volatile or non-volatile computer readable storage media. Cache 614 is a fast memory that enhances the performance of processor(s) 604 by holding recently accessed data, and data near recently accessed data, from memory 606.

Program instructions and data used to practice embodiments of the present invention, e.g., sound masking component 111 and database 112, can be stored in persistent storage 608 for execution and/or access by one or more of the respective processor(s) 604 of sound masking server 110 via memory 606. In this embodiment, persistent storage 608 includes a magnetic hard disk drive. Alternatively, or in addition to a magnetic hard disk drive, persistent storage 608 can include a solid-state hard drive, a semiconductor storage device, a read-only memory (ROM), an erasable programmable read-only memory (EPROM), a flash memory, or any other computer readable storage media that is capable of storing program instructions or digital information.

The media used by persistent storage 608 may also be removable. For example, a removable hard drive may be used for persistent storage 608. Other examples include optical and magnetic disks, thumb drives, and smart cards that are inserted into a drive for transfer onto another computer readable storage medium that is also part of persistent storage 608.

Communications unit 610, in these examples, provides for communications with other data processing systems or devices, including resources of client computing device 120. In these examples, communications unit 610 includes one or more network interface cards. Communications unit 610 may provide communications through the use of either or both physical and wireless communications links. Sound masking component 111 and database 112 may be downloaded to persistent storage 608 of sound masking server 110 through communications unit 610.

I/O interface(s) 612 allows for input and output of data with other devices that may be connected to sound masking server 110. For example, I/O interface(s) 612 may provide a connection to external device(s) 616 such as a keyboard, a keypad, a touch screen, a microphone, a digital camera, and/or some other suitable input device. External device(s) 616 can also include portable computer readable storage media such as, for example, thumb drives, portable optical or magnetic disks, and memory cards. Software and data used to practice embodiments of the present invention, e.g., sound masking component 111 and database 112 on sound masking server 110, can be stored on such portable computer readable storage media and can be loaded onto persistent storage 608 via I/O interface(s) 612. I/O interface(s) 612 also connect to a display 618.

Display 618 provides a mechanism to display data to a user and may be, for example, a computer monitor or the lenses of a head mounted display. Display 618 can also function as a touchscreen, such as a display of a tablet computer.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium can be any tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, a special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/ or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, a segment, or a portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A method for adaptive sound masking of movements generated by a single user, the method comprising:
   receiving, by one or more computer processors, a request associated with a single user for adaptive sound masking of sound associated with a first movement of the single user, wherein the first movement of the single user comprises of, moving the one or more body parts from a first location to a second location wherein the first location is not spatially the same as the second location such as: playing tennis, navigating a factory floor, and performing engine assembly;
   analyzing, by the one or more computer processors, an activity of the single user and storing a first information associated with the activity of the single user;
   generating, by the one or more computer processors, a first cognitive sound mask based on the first information;
   producing, by the one or more computer processors, a sound cone based on the first cognitive sound mask and directing the sound cone at the first movement of the single user; and
   adapting, by the one or more computer processors, the sound cone based on changes in sound associated with subsequent movements of the single user; and
   forecasting, by the one or more computer processors, the sound cone based on predicting the future movements of the single user and producing the sound cone based on the predicted future movement of the single user.

2. The method of claim 1, wherein adapting the sound cone further comprises:
   analyzing, by the one or more computer processors, the activity of the one or more users and storing a second information associated with the activity of the user;
   generating, by the one or more computer processors, a second cognitive sound mask based on the second information; and
   producing, by the one or more computer processors, the sound cone based on the second cognitive sound mask and directing the sound cone at a second movement of the one or more users.

3. The method of claim 1, wherein analyzing the activity of the user further comprises:
   determining, by the one or more computer processors, a profile based on the surrounding environment wherein the profile further comprises, a user profile based on a learned behavior of the users, a sound profile based on environmental surroundings and a group profile based on a learned behavior of the users in a group of users.

4. The method of claim 1, wherein generating the first cognitive sound mask further comprises:
   tagging, by the one or more computer processors, at least one of the users with a user profile or a group of users with a group profile;
   tagging, by the one or more computer processors, the one or more users with a sound profile; and
   incorporating, by the one or more computer processors, at least of the user profile and the sound profile into the first cognitive sound mask.

5. The method of claim 1, wherein producing the sound cone further comprises:
   directing, by the one or more computer processors, the sound cone at the users.

6. The method of claim 2 wherein adapting the sound cone further comprises:
   analyzing, by the one or more computer processors, a change in status of the one or more users and storing a second information associated with the activity of the user.

7. The method of claim 6 wherein analyzing the change in status of the one or more users further comprises:
   receiving, by the one or more computer processors, data from a sensor, comprising at least of, a hand gesture, a facial expression, a gaze pattern, a heartbeat, a result of a current task and a pupil size.

8. The method of claim 5 wherein producing the sound cone is based on at least one transducer.

9. A computer program product for adaptive sound masking of movements generated by a single user, the computer program product comprising:
   one or more non-transitory computer readable storage media and program instructions stored on the one or more non-transitory computer readable storage media, the program instructions comprising:

the program instructions to receive a request associated with a single user for adaptive sound masking of a first movement of the single user, wherein the first movement of the single user comprises of, moving the one or more body parts from a first location to a second location wherein the first location is not spatially the same as the second location such as playing tennis, navigating a factory floor, and performing engine assembly;

the program instructions to analyze an activity of the single user and storing a first information associated with the activity of the user;

the program instructions to generate a first cognitive sound mask based on the first information;

the program instructions to produce a sound cone based on the first cognitive sound mask and directing the sound cone at the first movement of the single user;

the program instructions to adapt the sound cone based on changes associated with the first movement of the single user; and the program instructions to forecast the sound cone based on predicting the future movements of the single user and the program instructions to produce the sound cone based on the predicted future movement of the single user.

10. The computer program product of claim 9, wherein program instructions to adapt the sound cone further comprise:

program instructions to analyze the activity of the user and storing a second information associated with the surrounding environment;

program instructions to generate a second cognitive sound mask based on the second information; and program instructions to produce the sound cone based on the second cognitive sound mask and directing the sound cone at a second movement of the one or more users.

11. The computer program product of claim 9, wherein program instructions to analyze the activity of the user further comprise:

program instructions to determine a profile based on the surrounding environment wherein the profile further comprises, a user profile based on a learned behavior of the users, a sound profile based on environmental surroundings and a group profile based on a learned behavior of the users in a group of users.

12. The computer program product of claim 9, wherein program instructions to generate the first cognitive sound mask further comprise:

program instructions to tag at least one of the users with a user profile or a group of users with a group profile;

program instructions to tag the one or more users with a sound profile; and program instructions to incorporate at least of the user profile and the sound profile into the first cognitive sound mask.

13. The computer program product of claim 10 wherein program instructions to adapt the sound cone further comprise:

program instructions to analyze a change in status of the one or more users and storing a second information associated with the activity of the user.

14. The computer program product of claim 13 wherein program instructions to analyze the change in status of the one or more users further comprise:

program instructions to receive data from a sensor, comprising at least of, a hand gesture, a facial expression, a gaze pattern, a heartbeat, a result of a current task and a pupil size.

15. A computer system for adaptive sound masking of movements generated by a single user, the computer system comprising:

one or more computer processors;

one or more computer readable storage media;

program instructions stored on the one or more computer readable storage media for execution by at least one of the one or more computer processors, the program instructions comprising:

the program instructions to receive a request associated with a single user for adaptive sound masking of sound associated with a first movement of the single user, wherein the first movement of the single user comprises of, moving the one or more body parts from a first location to a second location wherein the first location is not spatially the same as the second location such as playing tennis, navigating a factory floor, and performing engine assembly;

the program instructions to analyze an activity of the user and storing a first information associated with the activity of the single user in a sound profile;

the program instructions to generate a first cognitive sound mask based on the first information;

the program instructions to produce a sound cone based on the first cognitive sound mask and directing the sound cone at the first movement of the single user; and the program instructions to adapt the sound cone based on changes associated with subsequent movements of the single user; and the program instructions to forecast the sound cone based on predicting the future movements of the single user and the program instructions to produce the sound cone based on the predicted future movement of the single user.

16. The computer system of claim 15, wherein program instructions to adapt the sound cone further comprise:

program instructions to analyze the activity associated with the one or more users and storing a second information;

program instructions to generate a second cognitive sound mask based on the second information; and program instructions to produce the sound cone based on the second cognitive sound mask and directing the sound cone at a second movement of the user.

17. The computer system of claim 15, wherein program instructions to analyze the activity of the user further comprise:

program instructions to determine a profile based on the surrounding environment wherein the profile further comprises, a user profile based on a learned behavior of the users, a sound profile based on environmental surroundings and a group profile based on a learned behavior of the users in a group of users.

18. The computer system of claim 15, wherein program instructions to generate the first cognitive sound mask further comprise:

program instructions to tag at least one of the users with a user profile or a group of users with a group profile;

program instructions to tag the one or more users with a sound profile; and program instructions to incorporate at least of the user profile and the sound profile into the first cognitive sound mask.

19. The computer system of claim 16 wherein program instructions to adapt the sound cone further comprise:
   program instructions to analyze a change in status of the one or more users and storing a second information.

20. The computer system of claim 19 wherein program instructions to analyze the change in status of the one or more users further comprise:
   program instructions to receive data from a sensor, comprising at least of, a hand gesture, a facial expression, a gaze pattern, a heartbeat, a result of a current task and a pupil size.

* * * * *